March 21, 1933. L. B. ROTH 1,902,524
POWER LAWN MOWER
Filed Jan. 12, 1931  2 Sheets-Sheet 2

L. B. ROTH INVENTOR
BY Merrill M. Blackburn
ATTORNEY

Patented Mar. 21, 1933

1,902,524

UNITED STATES PATENT OFFICE

LESTER B. ROTH, OF PROPHETSTOWN, ILLINOIS

POWER LAWN MOWER

Application filed January 12, 1931. Serial No. 508,075.

The present invention pertains to lawn mowers and more especially to such as carry their own power unit for the propulsion of the mower and the driving of the cutting reel. Among the objects of this invention are to simplify constructions of this type; to provide a simplified control means for the clutch by means of which the power unit is connected to the ground wheels, or driving wheels, of the lawn mower; to provide separate clutches for the driving wheels and the cutting reel so that the former may be actuated alone or the two may be actuated together; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 4 is a section substantially along the plane indicated by the line 4—4, Fig. 1;

Fig. 5 is an elevation of a portion of the control mechanism taken in the direction indicated by the line 5—5, Fig. 1.

Figure 1:
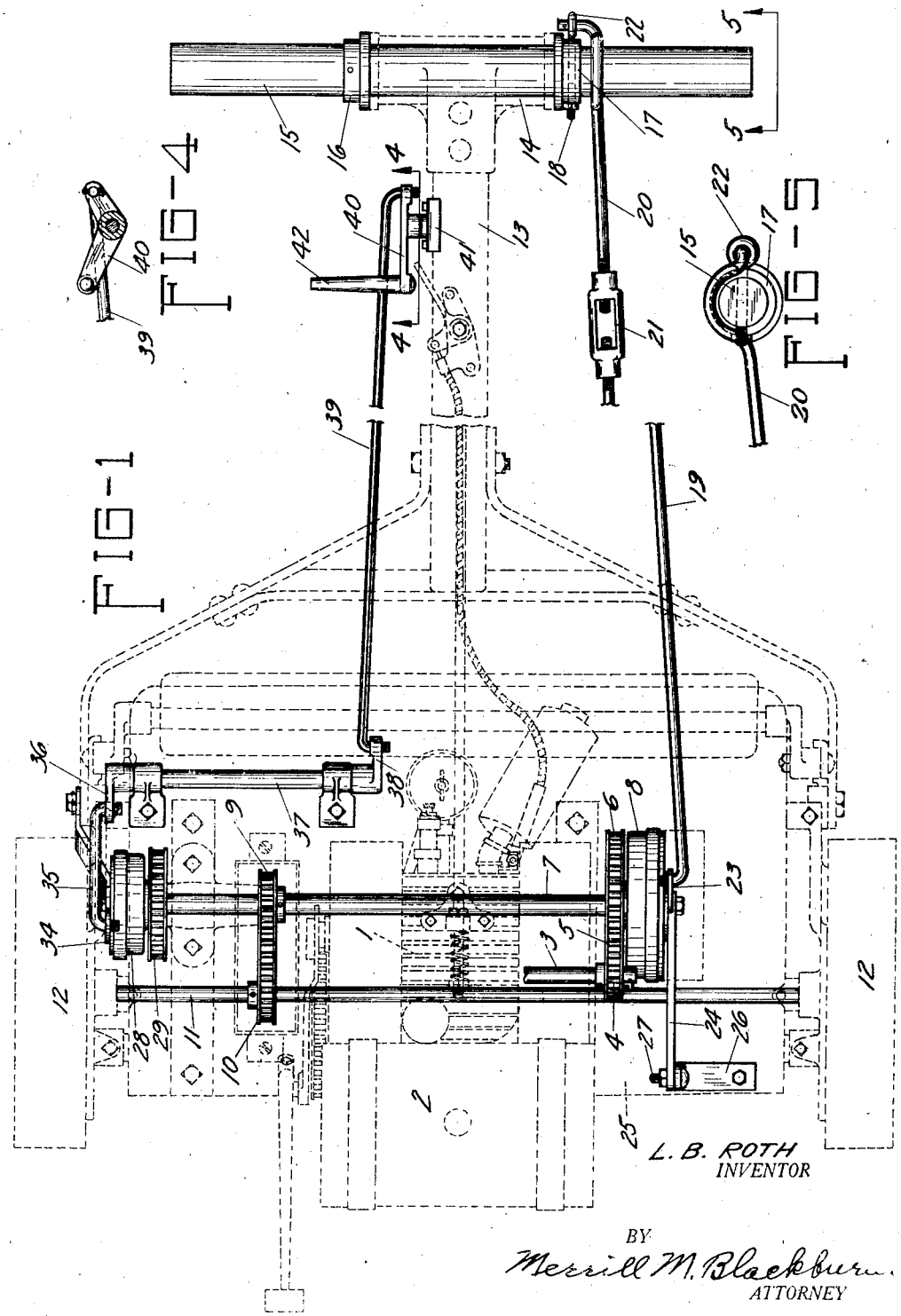
Fig. 1 is a plan view of my improved mechanism, the same being shown in solid lines in conjunction with a conventional lawn mower of this type, the latter being shown in dotted lines.
Figure 2:
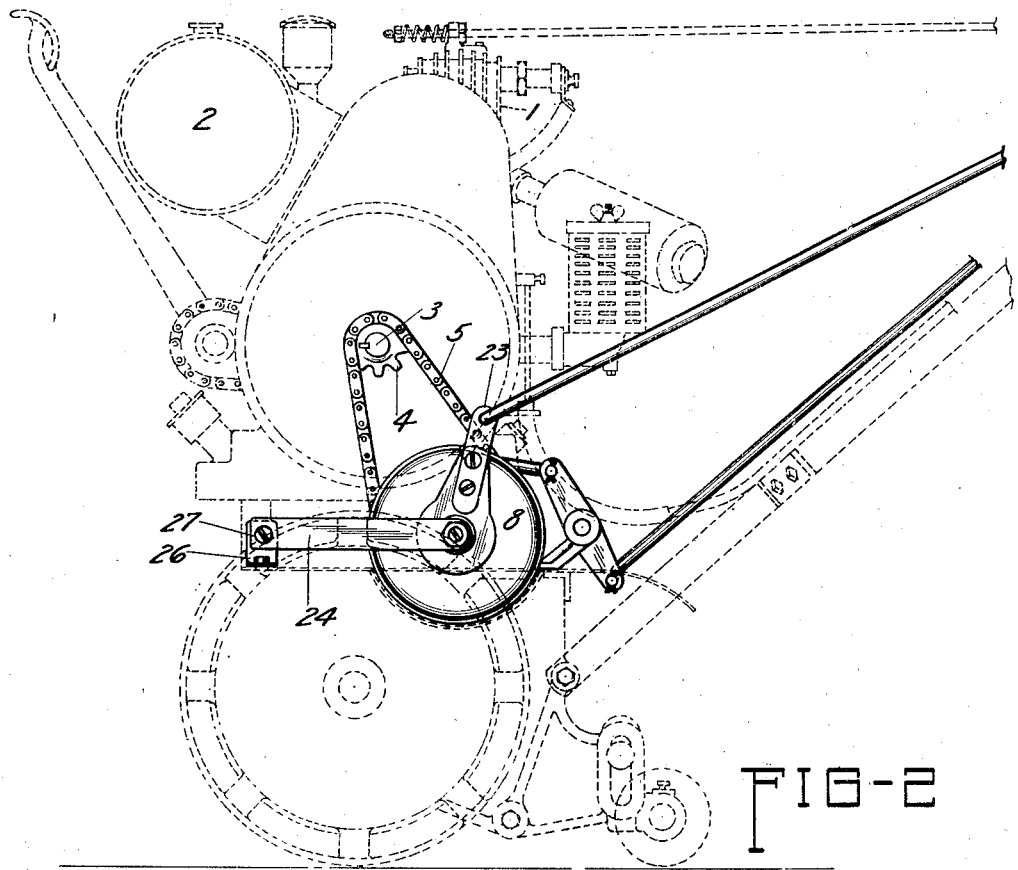
Fig. 2 is an end view of the structure shown in Fig. 1, as viewed from the left in that figure.
Figure 3:
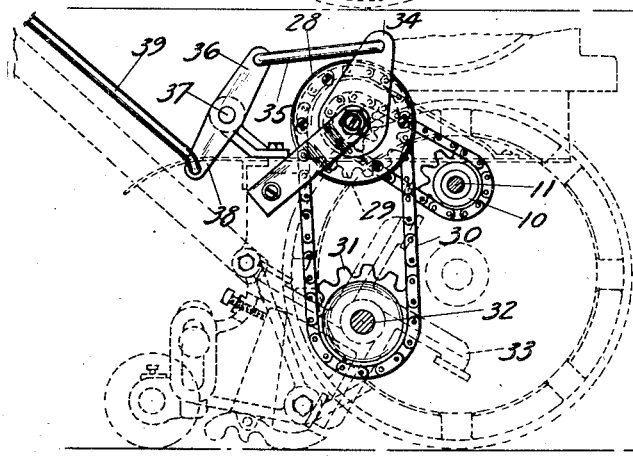
Fig. 3 is a similar view from the right side of Fig. 1.

I am aware that many patents have been granted on lawn mowers which carry their own power units, either in the form of an electric motor or an internal combustion motor, but I believe that my present construction is an improvement over such prior constructions. In my construction a suitable frame is carried by a pair of ground wheels and an internal combustion motor 1 and gasoline tank 2 are mounted upon this frame. The crank shaft 3 of the motor 1 extends laterally therefrom and carries at one end a sprocket wheel 4 which is connected by a sprocket chain 5 with a sprocket wheel 6 carried by the main drive shaft 7. However, the sprocket 6 is not directly connected to the shaft 7 but is connected thereto through a clutch 8 by means of which the sprocket 6, which runs continuously when the motor is running, is connected in driving relation with the shaft 7. Inasmuch as the clutch is of a well known type, it is not considered necessary to make a disclosure of the structure thereof in this connection.

A sprocket 9 is connected to the shaft 7 and a sprocket 10 to the driving shaft 11 upon which are mounted pinions whereby the ground wheels 12 are driven. Therefore, when the clutch 8 is put into driving condition, power is transmitted from the crank shaft 3 of the engine to the drive shaft 7 and from this to shaft 11 and the ground wheels 12. Likewise, when clutch 8 is out of driving condition, the mower will be permitted to stand still.

A handle 13 of the lawn mower, by means of which the same is steered, has a sleeve 14 secured thereto and through this extends a substantially cylindrical wooden handle 15 surrounded by a pair of collars 16 and 17. These collars prevent the handle 15 from sliding endwise through the sleeve 14. Also, an eye-bolt 18 passes through the collar 17 and handle 15 and secures the same together. A link comprising the sections 19 and 20 and the turnbuckle 21 connects the eye 22 of bolt 18 with crank arm 23 of clutch 8. Therefore, as handle 15 is rotated about its axis the eye 22 is carried with it and causes reciprocation of the link. This causes oscillation of the crank arm 23, resulting in the clutch being put into operative and inoperative positions. A brace 24 serves to stay the clutch 8 and its shaft 7 with relation to the top or cover plate 25 of the frame. As illustrated in Fig. 1, a bracket 26 is mounted on plate 25 and to this the brace 24 is connected by a bolt 27.

Cooperating with the opposite end of shaft 7 is a clutch 28 through which power is transmitted to a sprocket 29. From the latter power is transmitted through the sprocket chain 30 to the sprocket 31 and shaft 32. The cutting reel 33 is carried by shaft 32 and is therefore rotated whenever clutch 28 is put into operative condition. The crank arm 34 of clutch 28 is connected by a link 35 to the crank arm 36 carried by shaft 37. This shaft has a crank arm 38 at its opposite end which is connected to a link 39 whose opposite end is connected to a lever 40 mounted on the handle 13, as indicated at 41. The lever 40 and handle 42 together form a crank for the actuation of the link 39 and, ultimately, the clutch 28.

It will be seen from the foregoing that when the handle 15 is in the position illustrated in Fig. 1 the engine may be running but the lawn mower will not be driven. Assuming the engine to be running, the handle 15 is rotated forwardly to put the clutch 8 in operative position and the lawn mower will then be driven, being propelled forwardly by the motor. When the motor has reached the place where it is desired to start cutting grass, the crank 42 is pulled upwardly and backwardly which results in putting the clutch 28 into operative position, thus causing the cutting reel to be driven.

It will be seen from the foregoing that I have provided a machine which will accomplish the objects set forth herein.

Having now described my invention, I claim:

1. Control mechanism for a power lawn mower having an engine comprising an idler shaft carried by the lawn mower, clutch mechanism associated with said shaft for transmitting power from the shaft of the engine to the idler shaft, a drive shaft for the ground wheels of the lawn mower, driving connections between the idler shaft and the drive shaft, a shaft carrying the cutting reel of the lawn mower and driving connections between the idler shaft and the reel shaft, said connections including a clutch for completing or releasing the connection between the idler shaft and the reel shaft.

2. A control and power transmission mechanism for a power lawn mower having a reel carried by a shaft, comprising a main power transmission shaft, two clutches associated therewith, one for transmitting power to the shaft, and one for transmitting power from the shaft to the mower reel shaft, a driving connection between the mower engine and the first mentioned clutch whereby power may be transmitted from the motor shaft to the power shaft, through the clutch, a rotatable handle member and connections therefrom to the first mentioned clutch whereby the clutch may be put into operative and inoperative positions, a drive shaft for the mower ground wheels, a permanent driving connection between the power shaft and said drive shaft, a driving connection from the second mentioned clutch to the shaft of the cutting reel, control means mounted on the handle of the mower and connections between said control means and the second mentioned clutch whereby said second mentioned clutch may be put into operative or inoperative positions so that the cutting reel may be caused to rotate with the transmission shaft or left inoperative, notwithstanding rotation of the motor shaft.

3. A control and power transmission mechanism for a power lawn mower having a shaft upon which a cutting reel is carried, comprising a main power transmission shaft, two clutches mounted thereon, one for transmitting power to the power transmission shaft from the motor shaft and one for transmitting power from the power transmission shaft to the mower reel shaft, a driving connection between the mower engine and the first mentioned clutch whereby power may be transmitted from the motor shaft to the power transmission shaft through the clutch, driving connections between the second mentioned clutch and the reel shaft whereby power may be transmitted from the main power transmission shaft to the reel shaft at the will of the operator, and driving connections between the main power transmission shaft and the ground wheels of the mower.

In witness whereof, I hereunto subscribe my name to this specification.

LESTER B. ROTH.